United States Patent
Zhao et al.

(10) Patent No.: US 10,542,437 B2
(45) Date of Patent: Jan. 21, 2020

(54) SPECTRUM ACCESS METHOD AND APPARATUS UTILIZING SAME

(71) Applicants: Youping Zhao, Beijing (CN); Qixin Tai, Beijing (CN); Xin Guo, Beijing (CN); Chen Sun, Beijing (CN)

(72) Inventors: Youping Zhao, Beijing (CN); Qixin Tai, Beijing (CN); Xin Guo, Beijing (CN); Chen Sun, Beijing (CN)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 15/775,628

(22) PCT Filed: Nov. 23, 2016

(86) PCT No.: PCT/CN2016/106894
§ 371 (c)(1),
(2) Date: May 11, 2018

(87) PCT Pub. No.: WO2017/088752
PCT Pub. Date: Jun. 1, 2017

(65) Prior Publication Data
US 2018/0376340 A1    Dec. 27, 2018

(30) Foreign Application Priority Data

Nov. 27, 2015 (CN) .......................... 2015 1 0850081

(51) Int. Cl.
*H04W 16/14*    (2009.01)
*H04L 27/00*    (2006.01)
(Continued)

(52) U.S. Cl.
CPC .......... *H04W 16/14* (2013.01); *H04B 7/0413* (2013.01); *H04B 7/0456* (2013.01);
(Continued)

(58) Field of Classification Search
None
See application file for complete search history.

(56) References Cited

U.S. PATENT DOCUMENTS

| 2012/0302273 A1* | 11/2012 | Lin | ........................ | H04W 16/14 |
|---|---|---|---|---|
| | | | | 455/509 |
| 2013/0078991 A1* | 3/2013 | Nam | ...................... | H04B 7/024 |
| | | | | 455/423 |

(Continued)

FOREIGN PATENT DOCUMENTS

| CN | 102457360 A | 5/2012 |
|---|---|---|
| CN | 103298000 A | 9/2013 |

(Continued)

OTHER PUBLICATIONS

International Search Report dated Feb. 17, 2017, in PCT/CN2016/106894 filed Nov. 23, 2016.

*Primary Examiner* — Xavier Szewai Wong
(74) *Attorney, Agent, or Firm* — Xsensus LLP

(57) ABSTRACT

A spectrum access method and an apparatus utilizing same. A spectrum management apparatus includes at least one processor configured to: determine location information and antenna angle information of each of at least one secondary apparatus; in response to a request for accessing an idle spectrum of a primary apparatus, determine, according to the location information and the antenna angle information of each of the at least one secondary apparatus, a secondary apparatus to grant access to the idle spectrum; and provide, to a serving base station of each of the secondary apparatuses having the access granted, the location information and the antenna angle information of all of the secondary apparatuses having the access granted, to enable the serving base station to perform interference alignment preceding.

17 Claims, 6 Drawing Sheets

(51) Int. Cl.
*H04J 11/00* (2006.01)
*H04B 7/0413* (2017.01)
*H04B 7/0456* (2017.01)

(52) U.S. Cl.
CPC ....... *H04J 11/0023* (2013.01); *H04J 11/0026* (2013.01); *H04L 27/0006* (2013.01)

(56) References Cited

U.S. PATENT DOCUMENTS

| | | | | |
|---|---|---|---|---|
| 2014/0274103 | A1* | 9/2014 | Steer | H04W 16/14 455/454 |
| 2016/0088636 | A1* | 3/2016 | Zhao | H04W 72/082 455/454 |
| 2016/0119882 | A1* | 4/2016 | Liu | H04W 52/243 455/422.1 |
| 2017/0006475 | A1* | 1/2017 | Liu | H04B 17/336 |

FOREIGN PATENT DOCUMENTS

| | | | |
|---|---|---|---|
| CN | 103997391 | A | 8/2014 |
| CN | 105101220 | A | 11/2015 |
| WO | WO 2013/124524 | A1 | 8/2013 |

\* cited by examiner

SPECTRUM ACCESS METHOD AND APPARATUS UTILIZING SAME

FIELD

The present disclosure relates to a method and an apparatus for controlling spectrum access, and in particular to a spectrum access method based on interference alignment precoding technology and an apparatus using the method.

BACKGROUND

With the rapid development of the information technology and multi-service wireless network, the demand for broadband wireless service increases constantly while spectrum which is non-renewable resource is scarce. According to the existing fixed spectrum allocation strategy, many spectrums that have been allocated to licensed users are idle in certain time periods, which results in low utility efficiency of spectrums and large waste of spectrums. With cognitive radio (CR) technology, the utility efficiency of spectrums may be improved, and insufficiency of spectrum resources may be mitigated. Therefore the cognitive radio (CR) technology becomes research hotspot in the field of wireless communications.

A device (which is referred to as "secondary device" herein) employing the cognitive radio technology opportunistically accesses an idle frequency hand of a licensed user equipment (which is referred to as "primary device" herein) without affecting the normal communication of the licensed user equipment, thereby realizing dynamic spectrum access and improving utility efficiency of spectrums.

Although insufficiency of spectrum resources can be mitigated with the cognitive radio technology, a large number of secondary devices accessing the idle frequency band of the primary device may result in significant interferences among users and frequent changes in network status. In a conventional cognitive multiple-input multiple-output (MIMO) system, information exchange usually requires joint information exchange between a base station and a user equipment in the cognitive system. The efficiency of information exchange is greatly decreased as the number of the user equipments increases.

In addition, it is also necessary to consider a case where the secondary devices have different priorities (or Quality of Service (QoS) levels).

SUMMARY

In order to solve the above problem, a method for controlling access to an idle frequency band of a primary device based on interference alignment preceding technology and an apparatus, using the method are provided in the present disclosure.

According to an aspect of the present disclosure, a spectrum management apparatus is provided. The spectrum management apparatus includes one or more processors configured to: determine position information and antenna angle information of each of one or more secondary devices determine at least one secondary device which is allowed to access an idle portion of spectrum of a primary device based on the position information and the antenna angle information of each secondary device, in response to a request from the secondary device for accessing the idle portion of spectrum; and for each of the at least one secondary device which is allowed to access, transmit to a serving base station serving the secondary device the position information and the antenna angle information of all of the at least one secondary device which is allowed to access for the serving base station to perform interference alignment precoding.

According to another aspect of the present disclosure, a method for controlling spectrum access in a communication system is provided. The method includes: determining position information and antenna angle information of each of one or more secondary devices; determining at least one secondary device which is allowed to access an idle portion of spectrum of a primary device based on the position information and the antenna angle information of each secondary device, in response to a request from the secondary device for accessing the idle portion of spectrum; and for each of the at least one secondary device which is allowed to access, transmitting to a serving base station serving the secondary device the position, information and the antenna angle information of all of the at least one secondary device which is allowed to access for the serving base station to perform interference alignment precoding.

According to another aspect of the present disclosure, a method for accessing a spectrum in a communication system is provided. The communication system includes a spectrum management apparatus, one or more primary devices and one or more secondary devices. The method includes determining, by the spectrum management apparatus, at least one secondary device which is allowed to access an idle portion of spectrum of the primary device based on position information and antenna angle information of each secondary device, in response to a request from the secondary device for accessing the idle portion of spectrum; for each of the at least one secondary device which is allowed to access, transmitting, by the spectrum management apparatus, to a serving base station serving the secondary device the position information and the antenna angle information of all of the at least one secondary devices which is allowed to access; and performing, by the serving base station, interference alignment preceding on an actual transmission signal by using the transmitted position information and antenna angle information, for transmission to the secondary device which is served by the serving base station and allowed to access.

BRIEF DESCRIPTION OF THE DRAWINGS

The present disclosure may be better understood with reference to the following description given in conjunction with the drawings, in which same or like reference numerals are used to denote the same or like components throughout the drawings. The drawings, together with the detailed description below, are incorporated in the specification and form a part of the specification, and are used to further illustrate preferred embodiments of the present disclosure and explain principles and advantages of the present disclosure. In the drawings.

DETAILED DESCRIPTION OF EMBODIMENTS

Figure 1A:
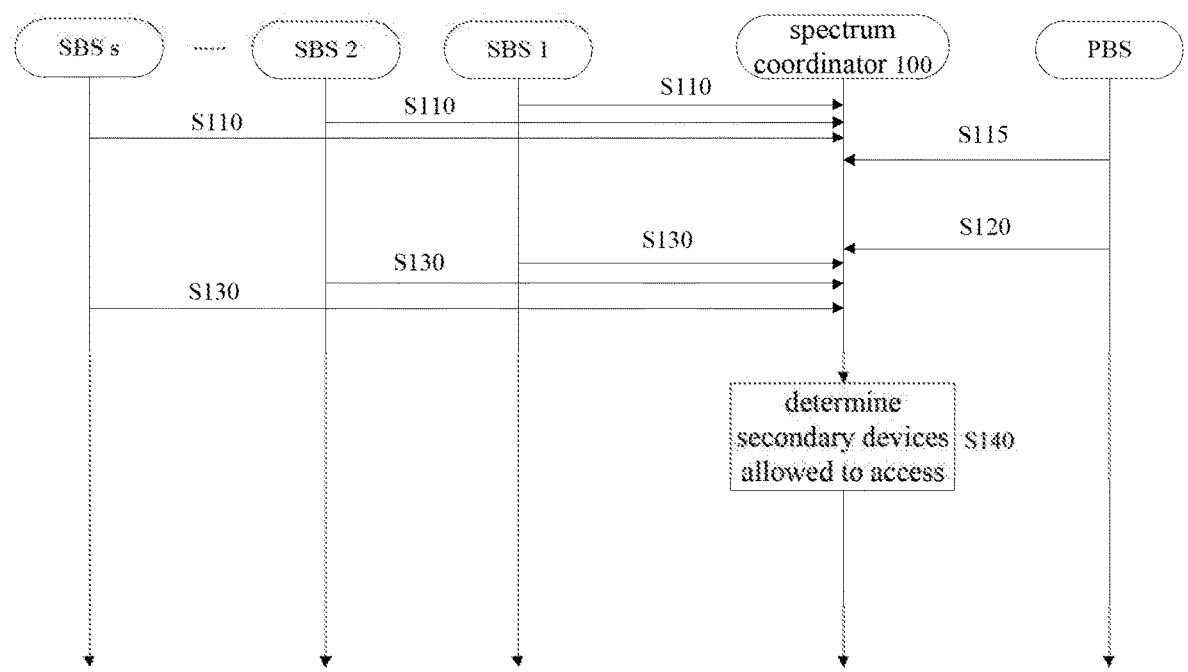
FIG. 1A and FIG. 1B are flowcharts schematically showing a process that a secondary device accesses an idle frequency band according to the present disclosure.
Figure 1B:
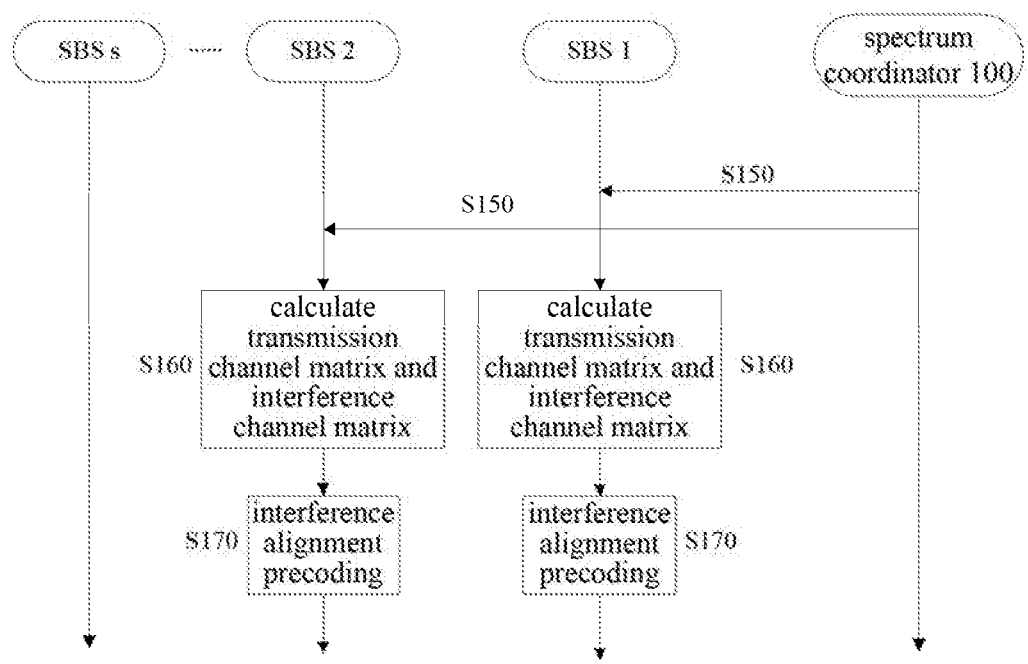

FIG. 1A and FIG. 1B are flowcharts showing a process of accessing an idle frequency band according to the present disclosure. As shown in FIG. 1A, a cognitive MIMO system according to the present disclosure includes a spectrum coordinator 100, a base station PBS serving a primary device, and multiple base nations SBS 1, SRS 2, . . . SBS s serving multiple secondary devices. Each of the multiple base stations SBS 1 to SBS s may be, for example, a base station in a microcell or a picocell.

Firstly, in step S110, each of the base stations SBS 1 to SBS s acquires position information and antenna angle information of a secondary device served by the base station, and then transmits the acquired position information and the acquired antenna angle information of the secondary device to the spectrum coordinator 100. Optionally, in step S110, each of the base stations SBS 1 to SBS s may farther report to the spectrum coordinator 100 whether the secondary device has a capability of supporting interference alignment precoding.

In step S115, the base station PBS reports a communication performance indicator (such as interference-to-noise ratio, INR) and antenna information (such as the number of antennas, antenna angle, etc.) of the primary device to the spectrum coordinator 100. Optionally, at step S115, the base station PBS may further report position information and antenna angle information of the primary device to the spectrum coordinator 100. Then, in step S120, the base station PBS reports to the spectrum coordinator 100 information indicating an idle portion of spectrum available for access by the secondary device.

It is assumed that the secondary devices served by the base stations SBS 1, SBS 2 and SBS s among the multiple base stations SBS 1 to SBS s require to access the idle portion of spectrum of the primary device for performing communication. Therefore, in step S130, each of the base stations SBS 1, SBS 2 and SBS s transmits a request message for requesting to access the idle portion of spectrum to the spectrum coordinator 100. It should be noted that, the above steps S110 to S130 only schematically explain the process, and the present disclosure is not limited to the order of performing the processes as described above. The above steps S110 to S130 may be performed in an order different from that shown in FIG. 1A.

Next, in step S140, the spectrum coordinator 100 determines, based on the receded information on the secondary device and the primary device, whether to allow the secondary devices served by the base stations SBS 1, SBS 2 and SBS s which transmit the request messages to access the idle portion of spectrum. The process of step S140 is described below in detail with reference to FIG. 2 and FIG. 3.

Reference is made to the flowchart shown in FIG. 1B after the secondary devices which are allowed to access the idle portion of spectrum are determined. It is assumed in FIG. 1B that the spectrum coordinator 100 allows only the secondary devices served by the base stations SBS 1 and SBS 2 to access the idle portion of spectrum. Therefore, in step S150, the spectrum coordinator 100 notifies each of the base stations SBS 1 and SBS 2 of the position information and the antenna angle information of all the secondary devices which are allowed to access as well as position information and antenna angle information of other devices which are interfered by the secondary devices served by the corresponding base station and allowed to access.

As shown in step S100, upon the receipt of relevant information notified by the spectrum coordinator 100, each of the base stations SBS 1 and SBS 2 calculates, based on the relevant information, a transmission channel matrix and an interference channel matrix for the secondary device which is served by the base station and allowed to access. Next, in step S170, each of the base stations SBS 1 and SBS 2 performs interference alignment precoding on a transmission signal for the secondary device which is served by the base station and allowed to access, and transmits the preceded signal to the secondary device which is served by the base station and allowed to access.

Figure 2:
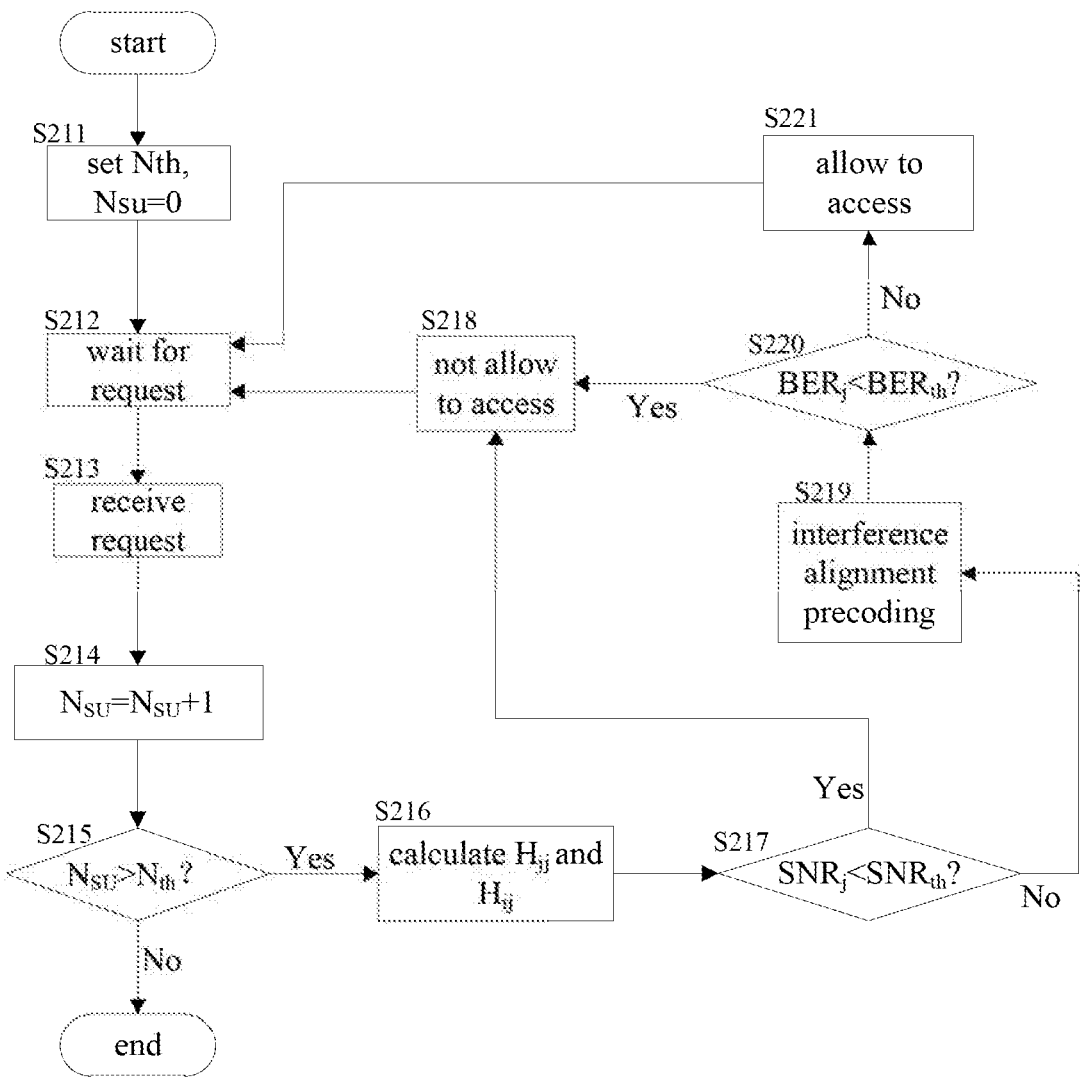
FIG. 2 is a flowchart showing a process that a spectrum coordinator determines secondary devices which are allowed to access an idle frequency band according to a first embodiment.

A process (step S140 in FIG. 1A) that the spectrum coordinator 100 determines secondary devices which are allowed to access an idle frequency band according to a first embodiment is described below in detail with reference to FIG. 2. As shown in FIG. 2, in step S211, the spectrum coordinator 100 sets the maximum number Nth of secondary devices which are allowed to access the idle portion of spectrum based on information on the interference-to-noise ratio (INR) and the number of antennas of the primary device reported by the base station PBS in step S115. Besides, the spectrum coordinator 100 sets a value Nsu of a counter representing the number of secondary devices which have currently accessed the idle portion of spectrum of the primary device to 0.

Specifically, the report by the base station PBS in step S115 may be period with performed. Therefore, when the number of antennas or the INR of the primary device changes, the spectrum coordinator 100 may acquire the change and reset, based on the change, the maximum number Nth of secondary devices which are allowed to access. In this way, a value of the parameter Nth may be dynamically set based on a change in communication performance of the primary device. For example, in a case where the INR of the primary device is equal to 0 dB, it indicates that an allowable amount of interference for the primary device is equal to an amount of noise. In addition, when the INR of the primary device decreases, it indicates that the allowable amount of interference decreases. In this case, the spectrum coordinator 100 may reset the value of the parameter Nth to a smaller value. That is, the spectrum coordinator 100 may reduce the number of secondary devices which are allowed to access the idle portion of spectrum of the primary device, thereby reducing interference to the primary device from the secondary devices. In addition, when the INR of the primary device increases, the spectrum coordinator 100 may increase the value of the parameter Nth.

In addition, as described above, each of the base stations SBS 1 to SBS s may further report to the spectrum coordinator 100 whether the secondary device served by the base station has the capability of supporting interference alignment precoding in step S110. In this case, the spectrum coordinator 100 may set the maximum number Nth of secondary devices which are allowed to access based on whether each secondary device has the capability. For example, since interference among secondary devices as well as interference between the secondary devices and the primary device may be well suppressed by means of interference alignment precoding, the spectrum coordinator 100 may set the maximum number Nth of secondary devices which are allowed to access to be a greater value in a case where the number of secondary devices supporting interference alignment precoding in the system is larger. Otherwise, the value of the parameter Nth is set to be a smaller value.

As shown in step S212, the spectrum coordinator 100 enters into a stand-in state after setting Nth and Nsu, that is, the spectrum coordinator 100 waits to receive an access request from a secondary device. When receiving a request message for requesting to access the idle portion of spectrum from a specific secondary device in step S213, the spectrum coordinator 100 increases the value Nsu of the counter by 1 in step S214. Next, in step S215 the spectrum coordinator 100 compares the increased value Nsu of the counter with the previously set maximum number Nth. If it is determined in step S215 that Nsu is greater than Nth, which indicates that the maximum number of the secondary devices allowed to access the idle frequency band will be exceeded, and thus the request from the secondary device is not approved, and the process is ended. In addition, if it is determined in step S215 that Nsu is less than or equal to Nth, which indicates that the maximum number of the secondary devices allowed to access will not be exceeded even when the specific secondary device accesses the idle portion of spectrum, and thus the process proceeds to step S216.

In step S216, the spectrum coordinator 100 calculates, based on the acquired position information and the acquired antenna angle information of each secondary acute (for example, in step S110 of FIG. 1A), a transmission channel matrix $H_{jj}$ and an interference channel matrix $H_{ij}$ for a secondary device (which is hereinafter referred to as a j-th secondary devices requesting access, where i, j=0, 1, ..., s, and i≠j. The transmission channel matrix $H_{jj}$ indicates the communication channel between the j-th secondary device and a secondary device corresponding to the j-th secondary device at the other party, and the interference channel matrix $H_{ij}$ indicates the interference channel between the j-th secondary device and other secondary devices. Specifically, in the case where the base station PBS additionally reports the position information and the antenna angle information of the primary device to the spectrum coordinator 100 in step S115, the interference channel matrix $H_{ij}$ calculated here may also indicate the interference channel between the j-th secondary device and the primary device.

The spectrum coordinator 100 starts to evaluate reception performance for the j-th secondary device requesting access in step S216 to determine whether to allow the j-th secondary device to access the idle frequency band based on the evaluation result. In general, the spectrum coordinator 100 generates a transmission signal for evaluation, performs interference alignment precoding on the transmission signal (i.e., evaluation signal) and transmits the precoded signal, calculates the reception performance of the j-th secondary device with respect to the transmission signal, and determines, based on the reception performance, whether to allow the j-th secondary device to access the idle portion of spectrum, which will be described below in detail.

In step S217, the spectrum coordinator 100 calculates, based on the transmission channel matrix $H_{jj}$ for the j-th secondary device calculated in step S216, a transmission signal-to-noise ratio (SNR) for the j-th secondary device, which may be expressed as follows:

$$SNR_j = \frac{H_{jj} W_j W_j^H H_{jj}^H}{Z_j Z_j^H} \quad (1)$$

where $H_{jj}$ represents transmission channel matrix for the j-th secondary device, $W_j$ represents transmission beam forming matrix for the j-th secondary device, and $Z_j$ represents gaussian noise.

If the calculated signal-to-noise ratio $SNR_j$ is less than a preset threshold $SNR_{th}$, which indicates that the communication performance of the j-th secondary device is relatively poor, the spectrum coordinator 100 rejects the access request from the secondary device as shown in step S218, and the process returns back to step S212 to be in the stand-by state. It should be noted that, the preset threshold $SNR_{th}$ may be set by those skilled in the art according to actual design requirements, which is not described herein.

If the signal-to-noise ratio $SNR_j$ calculated in step S217 is greater than or equal to the preset threshold $SNR_{th}$, the process proceeds to step S219. In step S219, the spectrum coordinator 100 performs interference alignment precoding on the evaluation signal to be transmitted to the j-th secondary device. An interference alignment precoding matrix to be used may be expressed as follows:

$$U_{0j} = \text{null}\{H_{0j}\}$$

$$U_{1j} = \text{null}\{H_{1j} U_{0j}\}$$

$$U_{sj} = \text{null}\{H_{sj} U_{(s-1)j} \ldots U_{0j}\} \quad (2)$$

where $H_{0j}$ represents interference channel matrix from the j-th secondary device to the 0-th secondary device, and so on, and $H_{sj}$ represents interference channel matrix from the j-th secondary device to the s-th secondary device. In addition, $U_{0j}$ represents interference alignment precoding matrix for the j-th secondary device with respect to the 0-th secondary device, which is placed on the leftmost in the interference alignment precoding, and so on, and $U_{sj}$ represents interference alignment precoding matrix for the j-th secondary device with respect to the s-th secondary device, which is placed on the rightmost in the interference alignment precoding. By performing, with the interference alignment precoding matrix U, interference alignment precoding on the transmission signal, (i.e., the evaluation signal generated by the spectrum coordinator 100) for the j-th secondary device and transmitting the precoded signal, the signal received by the j-th secondary device may be acquired, which may be expressed as follows:

$$\bar{y}_j = \beta_j H_{jj} \prod_{i=1, i \neq j}^{s} U_{ij} W_j x_j + \sum_{i=1, i \neq j}^{s} \left( \beta_i H_{ji} \prod_{k=0, k \neq i}^{s} U_{ki} W_i x_i \right) + Z_j \quad (3)$$

$$= \beta_j H_{jj} \prod_{i=1, i \neq j}^{s} U_{ij} W_j x_j + Z_j$$

$$= \hat{H}_{jj} x_j + Z_j$$

where $\beta_j$ represents transmission power control factor, and $x_j$ represents transmission signal. Since interference alignment precoding is performed, the item of $$\sum_{i=1, i \neq j}^{s} \left( \beta_i H_{ji} \prod_{k=0, k \neq i}^{s} U_{ki} W_i x_i \right) = 0$$

in the expression (3) is 0, which represents mutual interference between the j-th secondary device and other secondary devices. That is, mutual interference among the secondary devices may be eliminated by means of interference alignment preceding.

Then, the spectrum coordinator 100 restores the evaluation signal from the reception signal $\bar{y}_j$ by zero-forcing equalization or minimum mean square error (MMSE) criterion. The restored signal may be expressed as follows:

$$\hat{x}_j = \hat{H}_{jj}^{-1} \bar{y}_j \quad (4)$$

Since the spectrum coordinator 100 generates the transmission signal for evaluation as described above, the spectrum coordinator 100 may determine, based on the transmission signal and the restored signal $\hat{X}_j$ shown in the mathematic expression (4), the reception performance for the j-th secondary device, such as bit error rate (BER). The reception performance indicates quality of signal received by the j-th secondary device to a case that interference alignment preceding is performed on the transmission signal for the j-th secondary device.

Then as shown in step S220, the spectrum coordinator 100 compares the determined bit error rate $BER_j$ with a preset threshold $BER_{th}$. The threshold $BER_{th}$ may be set by those skilled in the art according to actual design requirements which is not described herein. If $BER_j$ is less than the threshold $BER_{th}$, which indicates that the j-th secondary device cannot achieve an acceptable quality of the received signal even if interference alignment precoding is performed, the spectrum coordinate 100 does not allow the j-th secondary device to access the idle portion of spectrum, and the process proceeds to step S218. In addition, if $BER_j$ is greater than or equal to the threshold $BER_{th}$, which indicates that interference among the secondary devices can be beneficially suppressed by means of interference alignment precoding and the j-th secondary device can achieve a relatively good reception performance, the spectrum coordinator 100 allows the j-th secondary device to access the idle portion of spectrum as shown in step S221, and the process returns back to S212 to be in the stand-by state again.

It should be noted that step S217 is optional in the process shown in FIG. 2. That is, the step of comparing the signal-to-noise ratios (SNRs) may be omitted. In this case, the spectrum coordinator 100 performs the interference alignment precoding process in step S219 immediately after calculating the transmission channel matrix and the interference channel matrix in step S210.

A process (step S140 in FIG. 1A) that the spectrum coordinator 100 determines secondary devices which are allowed to access an idle frequency band according to a second embodiment is described below in detail with reference to FIG. 3. The process differs from the process according to the first embodiment shown in FIG. 2 in that a situation where the secondary devices have different priorities is considered.

Figure 3:
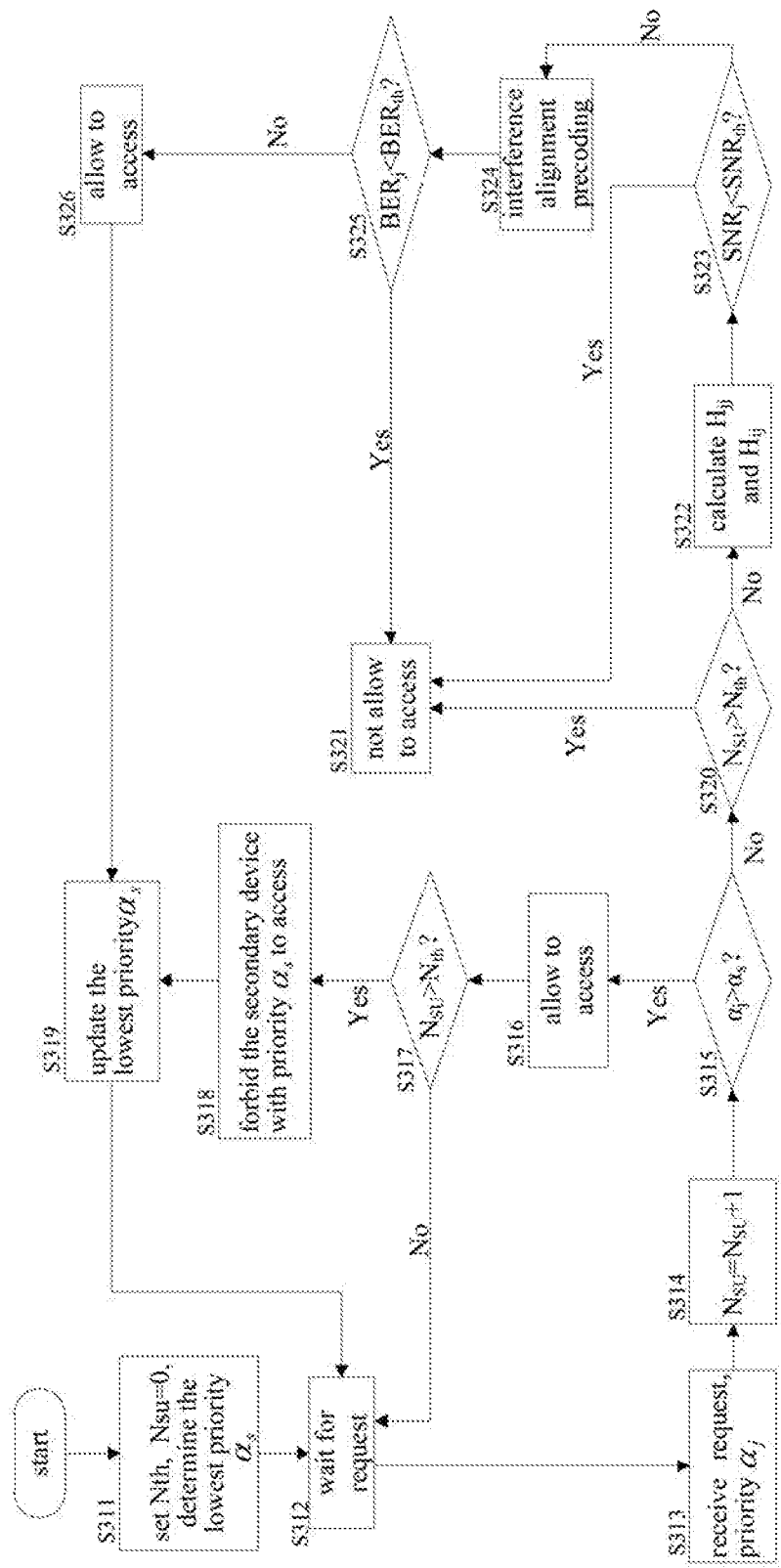
FIG. 3 is a flowchart showing a process that a spectrum coordinator determines secondary devices which are allowed to access an idle frequency band according to a second embodiment.

As shown in FIG. 3, in step S311 which is similar to step S211 in FIG. 2, the spectrum coordinator 100 sets the maximum number Nth of secondary devices which are allowed to access the idle portion of spectrum, and sets a value Nsu of a counter representing the number of secondary devices which have currently accessed the idle portion of spectrum to 0. In addition, in step S311, the spectrum coordinator 100 further determines the initial lowest priority $\alpha_s$ of the secondary devices in the system.

Then, in step S312, the spectrum coordinator 100 waits to receive an access request from a secondary device. In step S313, the spectrum coordinator 100 receives a request message for requesting to access the idle portion of spectrum from the j-th secondary device with priority $\alpha_j$. Next, the spectrum coordinator 100 increases the value Nsu of the counter by 1 in step S314, and compares the priority $\alpha_j$ of the j-th secondary device with the lowest priority $\alpha_s$ in step S315.

If the priority $\alpha_j$ of the j-th secondary device is greater than the lowest priority $\alpha_s$ in the system, which indicates that the secondary device requesting access has a higher priority, the spectrum coordinator 100 allows the j-th secondary device to access the idle portion of spectrum as shown in step S316. In this case, in step S317, the spectrum coordinator 100 compares the current value Nsu of the counter with the maximum number Nth of the secondary devices allowed to access. If Nsu is less than Nth, which indicates that the maximum number of the secondary devices allowed to access has not been reached, that is, an additional access is still possible, the process returns back to the step S312 to be in the stand-by state. If Nsu is greater than Nth, it indicates that the number of secondary devices accessing the idle portion of spectrum after allowing the j-th secondary device to access in step S316 will exceed the maximum number of the secondary devices allowed to access. In this case, the spectrum coordinator 100 terminates usage of the idle portion of spectrum, by the secondary device with the lowest priority $\alpha_s$ in step S318, and updates the lowest priority $\alpha_s$ in the system in step S319 after the termination operation. In addition, if the current value Nsu of the counter is equal to Nth the process also returns back to step S312 to be in the stand-by state, that is, the spectrum coordinator 100 waits to receive an access request from the next secondary device, which is the same as the case in which Nsu is less than Nth.

Referring back to step S315, if the priority $\alpha_j$ of the j-th secondary device is equal to or less than the lowest priority $\alpha_s$ in the system, it is further determined whether the current value of the counter Nsu is greater than the maximum number Nth of the secondary devices allowed to access, as shown in step S320.

If it is determined in step S320 that Nsu is greater than Nth, the j-th secondary device is not allowed to access the idle portion of spectrum, as shown in step S321.

If it is determined in step S320 that Nsu is less than or equal to Nth, the process proceeds to step S322, that is, the spectrum coordinator ion calculates, based on the acquired position information of each secondary device, a transmission channel matrix $H_{jj}$ and an interference channel matrix $H_{ij}$ for the j-th secondary device. Next, the spectrum coordinator 100 performs steps S323 to S326. The steps S323, S324, S325 and S326 are the same as steps S217, S219, S220 and S221 shown in FIG. 2, respectively, which are not repeated herein. It should be noted that the process of comparing the signal-to-noise ration (SNRs) in step S323 herein is also optional, which is similar to step S217 in FIG. 2.

Specifically, after allowing the j-th secondary device to access the idle portion of spectrum in step S326, the spectrum coordinator 100 needs to predetermine the lowest priority $\alpha_s$ of the secondary devices in the system, and the process proceeds to step S319. Next, the spectrum coordinator 100 returns back to step S312 to be in the stand-by state, waiting for an access request from the next secondary device.

It should be noted that, although the process of controlling access bused on a priority of a secondary device is mainly described, the process may also be performed based on the desired QoS level of the secondary device. The level of QoS corresponds to the level of priority.

Figure 4:
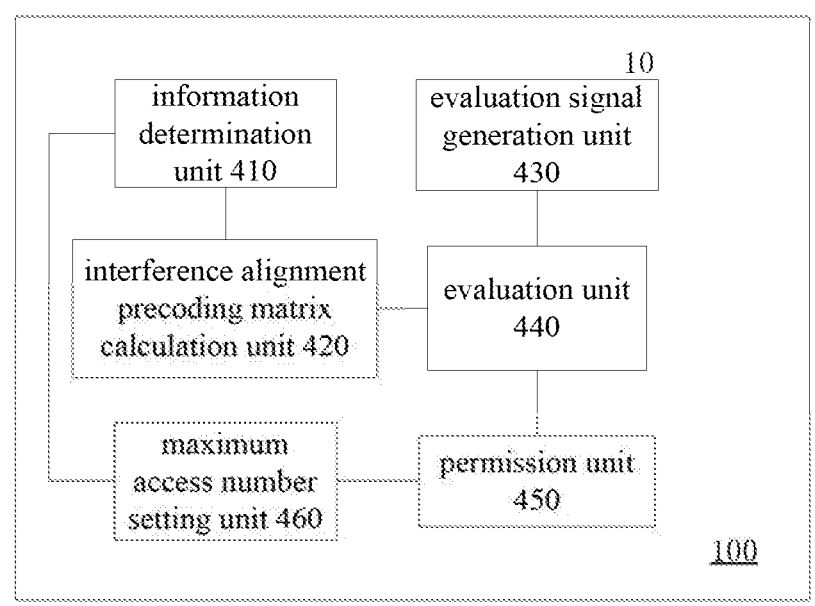
FIG. 4 shows a functional block diagram of a spectrum coordinator according to the present disclosure.

Functional modules of the spectrum coordinator 100 according to the present disclosure are described below with reference to FIG. 4. As shown in FIG. 4, the spectrum coordinator 100 includes an information determination unit 410, an interference alignment precoding matrix calculation unit 420, an evaluation signal generation unit 430, an evaluation unit 440, a permission unit 450, and a maximum access number setting unit 460. The functional modules are described below one by one.

The information determination unit 410 determines, based on information reported by base stations SBS 1 to SBS s and PBS, information of each secondary device and a primary device, such as information on the number of antennas. Information on antenna angle, position information, communication performance information, information on whether interference alignment precoding is supported, and provides the determined information to the interference alignment precoding matrix calculation unit 420 and the maximum access number setting unit 460.

The interference alignment precoding matrix calculation unit 420 calculates, based on the relevant information on the secondary device and the primary device provided by the information determination unit 410, an interference channel matrix between a specific secondary device and other secondary devices and/or the primary device, and generates an interference alignment precoding matrix for the specific secondary device based on the calculated interference channel matrix, as shown in the mathematic expression (2).

The evaluation signal generation unit 430 generates an evaluation signal which is assumed to be transmuted to the specific secondary device for evaluating reception performance of the specific secondary device with respect to the evaluation signal.

The evaluation unit 440 receives the generated interference alignment precoding matrix and the evaluation signal from the interference alignment precoding matrix calculation unit 420 and the evaluation signal generation unit 430, respectively, and performs preceding on the evaluation signal by using the interference alignment precoding matrix, to acquire a signal that may be received by the specific secondary device, as shown in the mathematic expression (3). The evaluation unit 440 restores the evaluation signal from the acquired reception signal and determines the reception performance (such as BER) for the evaluation signal by comparing the restored signal with the original evaluation signal. Then, the evaluation unit 440 provides the determined reception performance to the permission unit 450 as the evaluation result.

The permission unit 450 determines whether to allow the specific secondary device to access the idle portion of spectrum of the primary device based an the evaluation result. In addition to the reception performance, the permission unit 450 may also determine whether to allow the specific secondary device to access the idle portion of spectrum based on the priority (or QoS level) of the specific secondary device, or the maximum number of secondary devices which are allowed to access, and the like.

The maximum access number setting unit 460 sets, based on antenna information and communication performance information of the primary device and/or the capability of supporting interference alignment precoding of the secondary device provided by the information determination unit 410, the maximum number of secondary devices which are allowed to access the idle portion of spectrum, and provides the maximum number to the permission unit 450, so that the permission unit 450 may operate based on the maximum number.

Various embodiments of the present disclosure have been described above in detail in conjunction with the drawings. According to the present disclosure, the spectrum coordinator controls access of the secondary devices, so as to select an optimal combination of secondary devices to access a spectrum of the primary device, thereby ensuring a better communication performance for a cognitive device which accesses the spectrum compared to a case where spectrum access is not limited (uncontrolled), and improving utility efficiency of spectrums and system capacity.

In addition according to the present disclosure, for the secondary devices requesting access to the spectrum, the spectrum coordinator effectively coordinates the orderly access of the secondary devices, therein efficiently responding to frequent changes in network status in real time. In addition information (such as position information and antenna angle information) is exchanged only at base station side, so that the usage of pilot can be reduced, thereby reducing system energy consumption and pilot pollution. In addition, the present disclosure provides processes for a case in which the secondary devices have different priorities or QoSs, thereby meeting different QoS requirements of the secondary devices.

The base station described in the present disclosure may be implemented as any type of evolved node B (eNB), such as macro eNB and small eNB. The small eNB may be an eNB covering a cell smaller than a macro cell, such as pico eNB, micro eNB and home (femto) eNB. Alternatively, the base station may also be implemented as any other type of base stations, such as NodeB and base transceiver station (BTS). Various types of terminals each may operate as a base station by temporarily or semi-persistently performing functions of the base station. The base station may include a main body (also referred to as a base station device) configured to control wireless communication; and one or more remote radio heads provided separately from the main body.

The order of the steps described herein is merely illustrative, and the order in which the process or the flow is performed is not limited thereto. Without affecting the implementation of the present disclosure, the order of the steps may be changed, or some steps may be performed in parallel with other steps.

It should further be noted that various devices or components described herein are merely logical in nature and do not strictly correspond to physical devices of components. For example, the functionality of each component described herein may be implemented by multiple physical entities, or the functionality of multiple components described herein may be implemented by a single physical entity.

The series of processes executed by each device or component in the embodiments may be implemented by software, hardware, or a combination of software and hardware. Programs included in the software may be stored in advance in a storage medium provided inside or outside each device or component. As an example, during execution, these programs are written to a random access memory (RAM) and executed by a processor (such as CPU).

Figure 5:
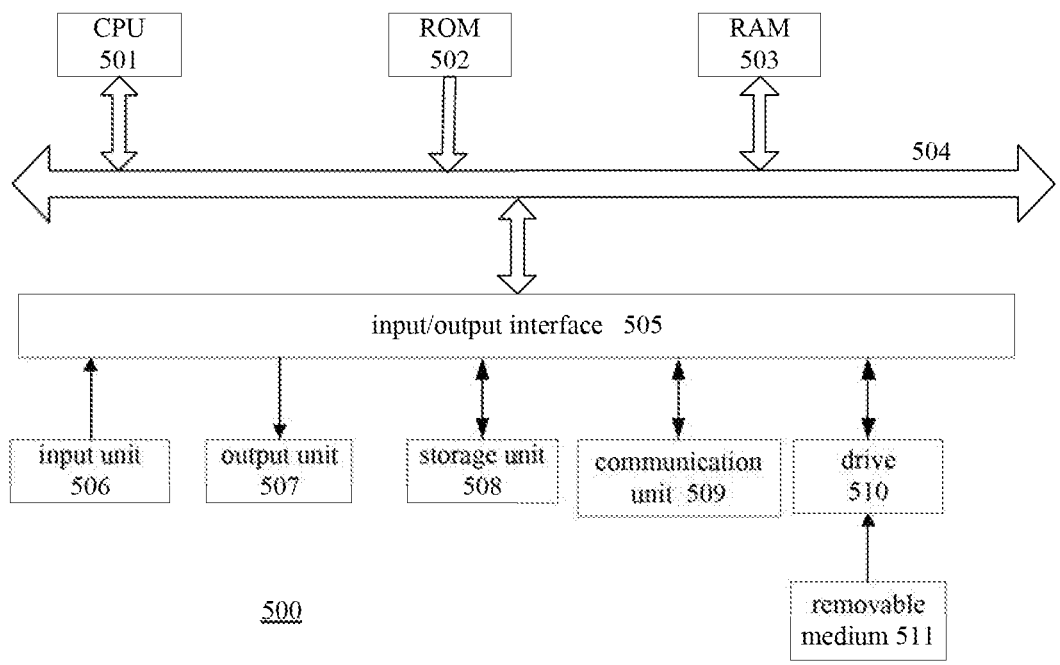
FIG. 5 is a block diagram, showing an example configuration of computer hardware.

FIG. 5 is a block diagram showing an example configuration of computer hardware that executes the above processes according to a program.

In computer 500, central processing unit (CPU) 501, read only memory (ROM) 502, and random access memory (RAM) 503 are connected to each other via bus 504.

An input/output interface 505 is further connected to the bus 504. The input/output interface 505 is connected with the following components: an input unit 506 including keyboard, mouse, microphone, and the like; an output unit 507 including display, speaker and the like; storage unit 508 including hard disk, nonvolatile memory or the like; communication unit 509 including network interface card (such as local area network (LAN) card, modem), and drive 510 that drives removable medium 511 such as magnetic disk, optical disk, magneto-optical disk, or semiconductor memory.

In the computer having the above configuration, the CPU 501 loads a program stored in the storage unit 508 into the RAM 503 via the input output interface 505 and the bus 504, and executes the program so as to execute the above processes.

The program to be executed by the computer (CPU 501) may be recorded on the removable medium 511 which is a package medium formed by for example magneto disk (including floppy disk), optical disk (including compact disk-read only memory (CD-ROM)), digital versatile disk (DVD), and the like), magneto-optical disk, or semiconductor memory, and the like in addition the program to be executed by the computer (CPU 501) may also be provided via a wired or wireless transmission medium such as a local area network the Internet, or digital satellite broadcast.

In a case where the removable medium is installed in the drive 510, the program may be installed in the storage unit 508 via the input/output interface 505. In addition, the program may be received by the communication unit 509 via a wired or wireless transmission medium, and then the program may be installed in the storage unit 508. Alternatively, the program may be installed in the ROM or the storage unit 508 in advance.

The program to be executed by the computer may be a program that executes the processes according to the order described in the present specification or may be a program that executes the processes in parallel or executes the processes when needed (for example, when called).

The embodiments an the technical effects of the present disclosure have been described above in detail in conjunction with the drawings, but the scope of the present disclosure is not limited thereto. It should be understood by those skill in the art that various modifications or changes in the embodiments discussed herein can be made without departing from the spirit and principle of the present disclosure, depending on design requirements and other factors. The scope of the present disclosure is defined by the appended claims or their equivalents.

In addition, the present disclosure may also be configured, as follows.

A spectrum management apparatus, including one or more processors configured to: determine position information and antenna angle information of each of one or more secondary devices; determine at least one secondary device which is allowed to access an idle, portion of spectrum of a primary device based on the position information and the antenna angle information of each secondary device, in response to a request from the secondary device for accessing the idle portion of spectrum; and for each of the at least one secondary device which is allowed to access, transmit to a serving base station serving the secondary device the position information and the antenna angle information of all of the at least one secondary device which is allowed to access for the serving base station to perform interference alignment preceding.

The one or more processors may further be configured to: determine antenna information and communication performance information of the primary device, and set a maximum number of the secondary devices which are allowed to access the idle portion of spectrum based on the determined antenna information and communication performance information; determine a transmission channel matrix and an interference channel matrix for the secondary device requesting access to the idle portion of spectrum based on the position information and the antenna angle information of each secondary device; determine reception performance of the secondary device requesting access based on the transmission channel matrix and the interference channel matrix; and determine whether to allow the secondary device requesting access to access the idle portion of spectrum based on the reception performance and the maximum number of the secondary devices which are allowed to access the idle portion of spectrum.

The one or more processors may further be configured to determine position information and antenna angle information of the primary device; and determine the interference channel matrix for the secondary device requesting access based on the position information and the antenna angle information of the primary device.

The one or more processors may further be configured to: generate an evaluation signal; determine an interference alignment precoding matrix for the secondary device requesting access by using the determined interference channel matrix; and determine the reception performance of the secondary device requesting access with respect to the evaluation signal at a case where interference alignment precoding has been performed on the evaluation signal by using the interference alignment precoding matrix.

The one or more processors may further be configured to: determine a reception signal obtained through receiving the evaluation signal by the secondary device requesting access, and restore the evaluation signal from the reception signal; and evaluate the reception performance based on the restored signal and the evaluation signal.

The one or more processors may further be configured to: determine an error rate of the restored signal; and allow the secondary device requesting access to access the idle portion of spectrum in a case where the error rate is less than a first threshold.

The one or more processors may further be configured to: determine a signal-to-noise ratio for the secondary device requesting access by using the determined transmission channel matrix; and determine the reception performance of the secondary device requesting access in a case where the signal-to-noise ratio is greater than a second threshold.

The one or more processors may further be configured to: set dynamically the maximum number of the secondary devices which are allowed to access the idle portion of spectrum based on a change in the antenna information and the communication performance information of the primary device.

The secondary devices may have different priorities, and the one or more processors may further be configured to: compare the priority of the secondary device requesting access with the lowest one of the priorities of the secondary devices which have accessed the idle portion of spectrum; and determine whether to allow the secondary device requesting access to access the idle portion of spectrum based on a result of comparison.

The one or more processors may further be configured to: allow the secondary device requesting access to access the idle portion of spectrum in a case where the priority of the secondary device requesting access is greater than the lowest priority.

The one or more processors may further be configured to: forbid a secondary device with the lowest priority to use the idle portion of spectrum if a number of the secondary devices which are currently allowed to access the idle portion of spectrum is greater than the maximum number, in a case where the secondary device requesting access is allowed to access the idle portion of spectrum.

The one or more processors may further be configured to: determine whether to allow the secondary device requesting access to access the idle portion of spectrum based on a number of the secondary devices which have accessed the idle portion of spectrum, in a case where the priority of the secondary device requesting access is less than or equal to the lowest priority.

The one or more processors may further be configured to: forbid the secondary device requesting access to access the idle portion of spectrum in a case where the number of the secondary devices which have accessed the idle portion of spectrum reaches to the maximum number; and determine the reception performance of the secondary device requesting access in a case where the number of the secondary devices which have accessed the idle portion of spectrum has not reached to the maximum number.

A method for controlling spectrum access in a communication system, including: determining position information and antenna angle information of each of one or more secondary devices; determining at least one secondary device which is allowed to access an idle portion of spectrum of a primary device based on the position information and the antenna angle information of each secondary device, in response to a request from the secondary device for accessing the idle portion of spectrum; and for each of the at least one secondary device which is allowed to access, transmitting to a serving base station serving the secondary device the position information and the antenna angle information of all of the at least one secondary device which is allowed to access for the serving base station to perform interference alignment precoding.

The method may further include: determining antenna information and communication performance information of the primary device, and setting a maximum number of the secondary devices which are allowed to access the idle portion of spectrum based on the determined antenna information and communication performance information; determining a transmission channel matrix and an interference channel matrix for the secondary device requesting access to the idle portion of spectrum based on the position information and the antenna angle information of each secondary device; determining reception performance of the secondary device requesting access based on the transmission channel matrix and the interference channel matrix; and determining whether to allow the secondary device requesting access to access the idle portion of spectrum based on the reception performance and the maximum number of the secondary devices which are allowed to access the idle portion of spectrum.

The method may further include generating an evaluation signal determining an interference alignment precoding matrix for the secondary device requesting access by using the determined interference channel matrix, and determining the reception performance of the secondary device requesting access with respect to the evaluation signal in a case where interference alignment preceding has been performed on the evaluation signal by using the interference alignment precoding matrix.

The method may further include: determining a reception signal obtained through receiving the evaluation signal by the secondary device requesting access, and restoring the evaluation signal from the reception signal; and evaluating the reception performance based on the restored signal and the evaluation signal.

The secondary devices may have different priorities, and the method may further include: comparing the priority of the secondary device requesting access with the lowest one of the priorities of the secondary devices which have accessed the idle portion of spectrum; and determining whether to allow the secondary device requesting access to access the idle portion of spectrum based on a result of comparison.

The method may further include: allowing the secondary device requesting access to access the idle portion of spectrum in a case where the priority of the secondary device requesting access is greater than the lowest priority.

The method may further include: determining whether to allow the secondary device requesting access to access the idle portion of spectrum based on a number of the secondary devices which have accessed the idle portion of spectrum, in a case where the priority of the secondary device requesting access is less than or equal to the lowest priority.

A method for accessing a spectrum in a communication system, where the communication system includes a spectrum management apparatus, one or more primary devices and one or more secondary devices, and the method includes: determining, by the spectrum management apparatus, at least one secondary device which is allowed to access an idle portion of spectrum of the primary device based on position information and antenna angle information of each secondary device, in response to a request from the secondary device for accessing the idle portion of spectrum for each of the at least out secondary device which is allowed to access transmitting, by the spectrum management apparatus, to a serving base station serving the secondary device the position information and the antenna angle information of all of the at least one secondary device which is allowed to access, and performing, by the serving base station, interference alignment precoding on an actual transmission signal by using the transmuted position information and antenna angle information, for transmission to the secondary device which is served by the serving base station and allowed to access.

The step of the determining the secondary devices which are allowed to access the idle portion of spectrum may further include: determining antenna information and communication performance information of the primary device, and setting a maximum number of the secondary devices which are allowed to access the idle portion of spectrum based on the determined antenna information and communication performance information; determining a transmission channel matrix and an interference channel matrix for the secondary device requesting access to the idle portion of spectrum based on the position information and the antenna angle information of each secondary device; determining reception performance of the secondary device requesting access based on the transmission channel matrix and the interference channel matrix; and determining whether to allow the secondary device requesting access to access the idle portion of spectrum based on the reception performance and the maximum number of the secondary devices which are allowed to access the idle portion of spectrum.

The step of the determining the reception performance of the secondary device requesting access may further include: generating an evaluation signal, determining an interference alignment precoding matrix for the secondary device requesting access by using the determined interference channel matrix; and determining the reception performance of the secondary device requesting access with respect to the evaluation signal in a case where interference alignment precoding has been performed on the evaluation signal by using the interference alignment precoding matrix.

The step of the determining the reception performance of the secondary device requesting access with respect to the evaluation signal may further include: determining a reception signal obtained through receiving the evaluation signal by the secondary device requesting access, and restoring the evaluation signal from the reception signal; and evaluating the reception performance based on the restored signal and the evaluation signal.

The secondary devices may have different priorities and the method may further include: comparing, by the spectrum management apparatus, the priority of the secondary device requesting access with the lowest one of the priorities of the secondary devices which have accessed the idle portion of spectrum; and determining by the spectrum management apparatus, whether to allow the secondary device requesting access to access the idle portion of spectrum based on a result of comparison.

The method may further include: allowing, by the spectrum management apparatus, the secondary device requesting access to access the idle portion of spectrum in a case where the priority of the secondary device requesting access is greater than the lowest priority; and determining, by the spectrum management apparatus, whether to allow the secondary device requesting access to access the idle portion of spectrum based on a number of the secondary devices which have accessed the idle portion of spectrum, in a case where the priority of the secondary device requesting access is less than or equal to the lowest priority.

The invention claimed is:

1. A spectrum management apparatus, comprising one or more processors configured to:
   determine position information and antenna angle information of secondary devices;
   determine at least one secondary device which is allowed to access an idle portion of spectrum of a primary device based on the position information and the antenna angle information of secondary device, in response to a request from the secondary device for accessing the idle portion of spectrum;
   determine antenna information and communication performance information of the primary device, and set a maximum number of the secondary devices which are allowed to access the idle portion of spectrum based on the determined antenna information and communication performance information;
   determine a transmission channel matrix and an interference channel matrix for the secondary device based on the position information and the antenna angle information of each secondary device;
   determine reception performance of the secondary device requesting access based on the transmission channel matrix and the interference channel matrix;
   determine whether to allow the secondary device to access the idle portion of spectrum based on the reception performance and the maximum number of the secondary devices; and
   for the secondary device which is allowed to access, transmit to a serving base station, the position information and the antenna angle information of the secondary device which is allowed to access to perform interference alignment precoding.

2. The spectrum management apparatus according to claim 1, wherein the one or more processors are further configured to:
   determine position information and antenna angle information of the primary device; and
   determine the interference channel matrix for the secondary device requesting access based on the position information and the antenna angle information of the primary device.

3. The spectrum management apparatus according to claim 1, wherein the one or more processors are further configured to:
   generate an evaluation signal;
   determine an interference alignment precoding matrix for the secondary device requesting access by using the determined interference channel matrix; and
   determine the reception performance of the secondary device requesting access with respect to the evaluation signal in a case where interference alignment precoding has been performed on the evaluation signal by using the interference alignment precoding matrix.

4. The spectrum management apparatus according to claim 3, wherein the one or more processors are further configured to:
   determine a reception signal obtained through receiving the evaluation signal by the secondary device requesting access, and restore the evaluation signal from the reception signal; and
   evaluate the reception performance based on the restored signal and the evaluation signal.

5. The spectrum management apparatus according to claim 4, wherein the one or more processors are further configured to:
   determine an error rate of the restored signal; and
   allow the secondary device requesting access to access the idle portion of spectrum in a case where the error rate is less than a first threshold.

6. The spectrum management apparatus according to claim 1, wherein the one or more processors are further configured to:
   determine a signal-to-noise ratio for the secondary device requesting access by using the determined transmission channel matrix; and
   determine the reception performance of the secondary device requesting access in a case where the signal-to-noise ratio is greater than a second threshold.

7. The spectrum management apparatus according to claim 1, wherein the one or more processors are further configured to:
   set the maximum number of the secondary devices which are allowed to access the idle portion of spectrum based on a change in the antenna information and the communication performance information of the primary device.

8. The spectrum management apparatus according to claim 1, wherein the secondary devices have different priorities, and the one or more processors are further configured to:
   compare the priority of the secondary device requesting access with the lowest one of the priorities of the secondary devices which have accessed the idle portion of spectrum; and determine whether to allow the secondary device requesting access to access the idle portion of spectrum based on a result of comparison;

allow the secondary device requesting access to access the idle portion of spectrum in a case where the priority of the secondary device requesting access is greater than the lowest priority.

9. The spectrum management apparatus according to claim 8, wherein the one or more processors are further configured to:

forbid the secondary device with the lowest priority to use the idle portion of spectrum if a number of the secondary devices which are currently allowed to access the idle portion of spectrum is greater than the maximum number, in a case where the secondary device requesting access is allowed to access the idle portion of spectrum.

10. The spectrum management apparatus according to claim 8, wherein the one or more processors are further configured to:

determine whether to allow the secondary device requesting access to access the idle portion of spectrum based on a number of the secondary devices which have accessed the idle portion of spectrum, in a case where the priority of the secondary device requesting access is less than or equal to the lowest priority.

11. The spectrum management apparatus according to claim 10, wherein the one or more processors are further configured to:

forbid the secondary device requesting access to access the idle portion of spectrum in a case where the number of the secondary devices which have accessed the idle portion of spectrum reaches to the maximum number; and determine the reception performance of the secondary device requesting access in a case where the number of the secondary devices which have accessed the idle portion of spectrum has not reached to the maximum number.

12. A method for controlling spectrum access in a communication system, comprising:

determining position information and antenna angle information of each of one or more secondary devices;

determining at least one secondary device which is allowed to access an idle portion of spectrum of a primary device based on the position information and the antenna angle information of each secondary device, in response to a request from the secondary device for accessing the idle portion of spectrum;

determining antenna information and communication performance information of the primary device, and setting a maximum number of the secondary devices which are allowed to access the idle portion of spectrum based on the determined antenna information and communication performance information;

determining a transmission channel matrix and an interference channel matrix for the secondary device requesting access to the idle portion of spectrum based on the position information and the antenna angle information of each secondary device;

determining reception performance of the secondary device requesting access based on the transmission channel matrix and the interference channel matrix;

determining whether to allow the secondary device requesting access to access the idle portion of spectrum based on the reception performance and the maximum number of the secondary devices which are allowed to access the idle portion of spectrum; and for each of the at least one secondary device which is allowed to access, transmitting to a serving base station serving the secondary device the position information and the antenna angle information of all of the at least one secondary device which is allowed to access for the serving base station to perform interference alignment precoding.

13. The method according to claim 12, further comprising:

generating an evaluation signal;

determining an interference alignment precoding matrix for the secondary device requesting access by using the determined interference channel matrix; and determining the reception performance of the secondary device requesting access with respect to the evaluation signal in a case where interference alignment precoding has been performed on the evaluation signal by using the interference alignment precoding matrix.

14. The method according to claim 13, further comprising:

determining a reception signal obtained through receiving the evaluation signal by the secondary device requesting access, and restoring the evaluation signal from the reception signal; and evaluating the reception performance based on the restored signal and the evaluation signal.

15. The method according to claim 12, wherein the secondary devices have different priorities, and the method further comprises:

comparing the priority of the secondary device requesting access with the lowest one of the priorities of the secondary devices which have accessed the idle portion of spectrum; and determining whether to allow the secondary device requesting access to access the idle portion of spectrum based on a result of comparison.

16. The method according to claim 15, further comprising:

allowing the secondary device requesting access to access the idle portion of spectrum in a case where the priority of the secondary device requesting access is greater than the lowest priority.

17. The method according to claim 15, further comprising:

determining whether to allow the secondary device requesting access to access the idle portion of spectrum based on a number of the secondary devices which have accessed the idle portion of spectrum, in a case where the priority of the secondary device requesting access is less than or equal to the lowest priority.

* * * * *